Patented Feb. 26, 1929.

1,703,133

UNITED STATES PATENT OFFICE.

LAWRENCE BRADSHAW AND HENRY V. DUNHAM, OF BAINBRIDGE, NEW YORK.

VEGETABLE GLUE AND PROCESS OF MAKING SAME.

No Drawing.   Application filed October 26, 1926.   Serial No. 144,400.

This invention has for its object the production of a vegetable glue or adhesive especially adapted for the gluing of wood, wood-veneer and the like, from mixtures of starch and vegetable protein substances, and involves both the dry glue base and the fluid adhesive.

It is known that adhesives can be prepared from certain vegetable seeds containing protein, such as hempseed, castor oil seed and soybean, by treatment with alkaline substances such as caustic soda, sodium carbonate and lime in presence of water. If, for example, a dry mixture consisting of 67 parts of finely pulverized soybean meal, 10 parts of sodium carbonate, 5 parts of sodium fluoride and 18 parts of lime, is stirred with 225 parts of water at ordinary room temperature for about twenty minutes, the resulting glue is useful for gluing plywood.

It is also well known that starch glues prepared by mixing cassava starch with water and caustic soda are in commercial use. It has been stated (U. S. Pat. 1,200,488) and is commonly observed that such glues, even with as much as three parts of water to one of dry starch are very viscous, and various methods have been proposed to increase their fluidity. We have found that by incorporating with the starch one or more of the aforementioned seed meals the gelatinous quality of the starch glue is reduced, thereby making it more easy to spread and, furthermore, greatly diminishing the tendency of the stacked veneers to side-slip in the press, such slipping being a serious disadvantage. On the other hand, we have found that the addition of starch to seed-glues of the type referred to above imparts to them, under certain conditions, a higher cohesive property and marked improvement in working qualities.

The main object of the invention is to provide a composite glue in which the undesirable viscid and slippery character of the starch glue is largely modified by the lower degree of cohesiveness of the seed-meal glue, and to realize this advantage in a simple formula such as in examples 2, 3 and 4 below.

The starch glue and the seed-meal glue may either be prepared separatively (with the addition of water) and then mixed together, or the starch and the seed meal may be incorporated dry with other ingredients (as hereinafter set forth) and the resulting mixture subsequently admixed with water.

As examples of methods and mixtures which have given satisfactory results the following may be given. The parts are by weight.

*Example 1.*

(A) Starch glue prepared by a well known commercial method: 215 pounds of water is placed in a steam-jacketed kettle provided with an efficient stirrer. 100 pounds of a good grade of cassava starch is stirred in. A solution of 3 pounds of caustic soda in 10 pounds of water is then added and the whole is heated with constant stirring to about 165° F. This operation may take about 30 minutes. The glue is then cooled (preferably rapidly), with continued stirring, to room temperature (say 70 to 80° F.). This glue is very viscid and has a sluggish flow.

(B) Peanut meal glue prepared by adding water to a dry base consisting of a mixture of pulverized peanut meal 63 parts, hydrated lime 25 parts, sodium carbonate 8 parts, sodium fluoride 4 parts. Method: 200 pounds of this dry mixture is added to 450 parts of water at about 60 to 80° F. in a suitable mixing kettle and stirred for about 20 minutes. The resulting glue, while of fairly good adhesive quality and fluidity, lacks cohesiveness, i. e. it tends to flow unevenly and to break off "short" rather than to form strings in the well-known manner of starch glues.

The prepared glues A and B are then mixed together (preferably in the amounts above stated) and well stirred for about 5 minutes. The final product is sufficiently cohesive, flows smoothly and uniformly, and spreads readily in the glue-spreading machine. It is superior in working qualities to the starch glue (A), and plywood sheets spread with it show much less tendency to side-slip in the wood press.

This example is given by way of illustration. It will be understood that both the starch glue (A) and the seed-meal glue (B) may be prepared by other formulas, and that the amount of glue B added to glue A may be varied considerably.

Although the foregoing example has given satisfactory results, we prefer for most purposes to mix the various dry ingredients into a single glue-base as in Examples 2, 3 and 4 following. This dry base can be conveniently stored, and shipped to the point where it is to be used, where it is then mixed with water as required.

Example 2.

Peanut meal 33 parts, cassava starch 33 parts, hydrated lime 20 parts, sodium carbonate 9 parts, sodium fluoride, 5 parts. These substances are thoroughly blended together in the dry state, thereby forming a dry glue base. The mixture is subsequently added to about 225 parts of water in a steam-jacketed mixing kettle with good agitation and heated to about 150–160° F. and maintained at this temperature for about 5 minutes, after which it is ready for use. The heating operation may take about 30 minutes and should not be unduly prolonged. The object is to promote the rupture of the starch granules; and the end-point is indicated by the lustrous, semi-clear appearance and cohesive quality of the glue. Before applying, the glue is preferably allowed to cool to about 70–80° F., the stirring being continued.

As an alternative method (which we prefer) the water may be pre-heated in the kettle to about 160° F., and the glue base added to the hot water with agitation as above: in this case the temperature is preferably maintained at 150–160° F. for about 15 minutes and the glue is then allowed to cool.

In either method the rate of cooling is preferably accelerated by passing cold water through the jacket. The resulting glue is of suitable consistency, cohesiveness and tenacity, and flows and spreads readily. It should be used up within a period of about 24 hours after mixing the base with water.

Example 3.

Peanut meal 40 parts, cassava starch 25 parts, hydrated lime 18 parts, tri-sodium phosphate 15 parts, sodium fluoride 2 parts. Proceed as in Example 2. The properties of this glue are similar to those of Example 2.

Example 4.

Peanut meal 30 parts, cassava starch 35 parts, hydrated lime 15 parts, sodium carbonate 5 parts, tri-sodium phosphate 3 parts, sodium fluoride 8 parts, sodium sulphite 4 parts. Proceed as in Example 2. The finished glue resembles Example 2 in general properties.

It will be evident that various modifications of these methods can be used without departing from the scope of the invention. Likewise we do not desire to be limited to the particular compounds and proportions given here by way of illustration. In place of cassava, we may use other starches such as potato starch and we may substitute for peanut meal other seed meals containing a relatively large percentage of protein, such as those of cottonseed, linseed, hempseed, soybean, castor oil seed and the like, or mixtures thereof. We believe that the small amounts of starch which are naturally present in some of these seeds take part in the reaction under the conditions described in the above examples.

The peanut meal (or other seed-meal) employed is preferably that from which, after removing a substantial portion at least of the husk or seed-coating, a major portion of the oil has been removed by pressing or extraction, such as the ground press-cake of commerce. The commercial meal may require further grinding. We prefer to use a meal of such fineness that substantially all of it will pass through an 80 to 120 mesh screen.

In the appended claims, the term "meal" and the term "press-cake" are intended to include the meals and press-cakes whether the oil is partially or completely removed therefrom or whether or not the hull or seed coating is partially or wholly removed therefrom.

The term "alkaline earth hydroxide" as used in the claims is intended to include the corresponding oxide, and also the oxide and hydroxide of magnesium. The term "salt" is intended to include both the singular and plural forms, i. e. one salt or several salts of the kinds herein mentioned. The salts used are in most cases such as will react with lime or the like, when water is added. The term "alkaline salt" as used here refers to the water-soluble salts of the alkali metals which react alkaline to litmus; and "caustic alkali" refers to the hydroxides of sodium and potassium. The term "alkali" is of broader significance and embraces caustic alkalies, alkaline earth oxides and hydroxides, and alkaline salts such as sodium carbonate, trisodium phosphate and the corresponding potassium compounds. The term "mixing with water" includes mixing either with hot or cold water. However, instead of mixing with hot water we may mix with cold water and subsequently heat to above the temperature at which the starch granules burst in the presence of the admixed compounds.

In the above examples we have used lime as an ingredient of the composition, the function of which is partly to interact with the alkali metal salts present to liberate caustic alkali, and partly to aid the setting and increase the water-resistant properties of the adhesive. It will be understood that in some cases, especially when free caustic alkali (e. g. caustic soda) is added, the lime may be omitted.

Example 5.

As an example of the omission of lime, a dry mixture is made from 65 parts of starch, 30 parts of peanut meal, 3 parts of sodium carbonate and 2 parts of sodium fluoride. This base is subsequently added to 225 parts of water, already heated to about 160° F., in a kettle provided with a jacket and stirrer, and mixed for about two minutes.

Without interrupting the stirring, a solution of 2 parts of caustic soda in 12 parts of water is then added and the stirring continued for about fifteen minutes, preferably with the temperature maintained at 140–150° F., after which the glue is allowed to cool to 100° F. or below, preferably with continued stirring. If desired, the rate of cooling may be hastened by passing cold water through the jacket. The fluid adhesive is then applied by the usual spreading machines, to wood veneers in making plywood.

Also, in place of lime, other alkaline earth oxides, or hydroxides such as those of barium and strontium may be employed, as well as magnesium oxide or hydroxide. Slaked lime is generally preferable, as being cheaper and efficient.

It will be understood that in many cases it is advisable to ship the dry glue base to the consumer, who will add water as described above and then use the adhesive thereby produced. The liquid mixture cannot be kept for long periods of time without undergoing considerable decomposition.

We claim:

1. A new wood working glue comprising a seed meal rich in protein, and added starch, together with an alkali.

2. A new wood working glue comprising a seed meal rich in protein, and added starch together with a caustic alkali, an alkali metal salt and an alkaline earth hydroxide.

3. A new wood working glue comprising a seed meal rich in protein, and added starch together with a caustic alkali metal salt and an alkaline earth hydroxide.

4. A new wood working glue comprising starch and peanut meal together with an alkali.

5. A new wood working glue comprising starch and peanut meal together with a caustic alkali, an alkaline earth hydroxide and an alkali metal salt capable of reacting with the latter.

6. A new wood working glue comprising starch and peanut meal together with an alkaline earth hydroxide and an alkali metal salt capable of reacting with the latter to liberate an alkali metal hydroxide.

7. A new base for the manufacture of wood-working glue, comprising a seed meal rich in protein, and added starch together with an alkali.

8. A new base for the manufacture of wood-working glue, comprising starch and a seed meal rich in protein, together with an alkaline earth hydroxide and an alkali metal salt capable of reacting with the latter.

9. A new base for the manufacture of wood-working glue, comprising starch and a seed meal rich in protein together with an alkaline earth hydroxide and an alkali metal salt capable of reacting with the latter, the alkaline earth hydroxide being in amount sufficient to maintain the material alkaline when water is added.

10. A new base for the manufacture of wood-working glue, comprising starch and peanut meal together with an alkali.

11. A new base for the manufacture of wood-working glue, comprising starch and peanut meal together with an alkaline earth hydroxide and an alkali metal salt capable of reacting with the latter when in the presence of water.

12. A new base for the manufacture of wood-working glue, comprising starch and peanut meal together with an alkali earth hydroxide and an alkali metal salt capable of reacting with the latter when water is added, said hydroxide and salt being in such proportions as to maintain the mixture alkaline when water is added.

13. A glue base which comprises starch and a vegetable seed-meal of relatively high protein content together with a plurality of inorganic salts and hydroxides of the alkali metals and alkaline earth metals, which in the presence of water react to form a solvent for the protein and the starch.

14. A glue base which comprises starch and a vegetable seed meal with a relatively high protein content together with a fixed alkali in amount capable of serving as a solvent for the protein and starch, when water is subsequently added.

15. A process for modifying the viscid and slippery character of starch wood-working glues, which consists in incorporating with the starch a substantial amount of a seed meal rich in protein and mixing with sufficient fixed-alkali and water to obtain a fluid consistency.

In testimony whereof we affix our signatures.

LAWRENCE BRADSHAW.
HENRY V. DUNHAM.